UNITED STATES PATENT OFFICE.

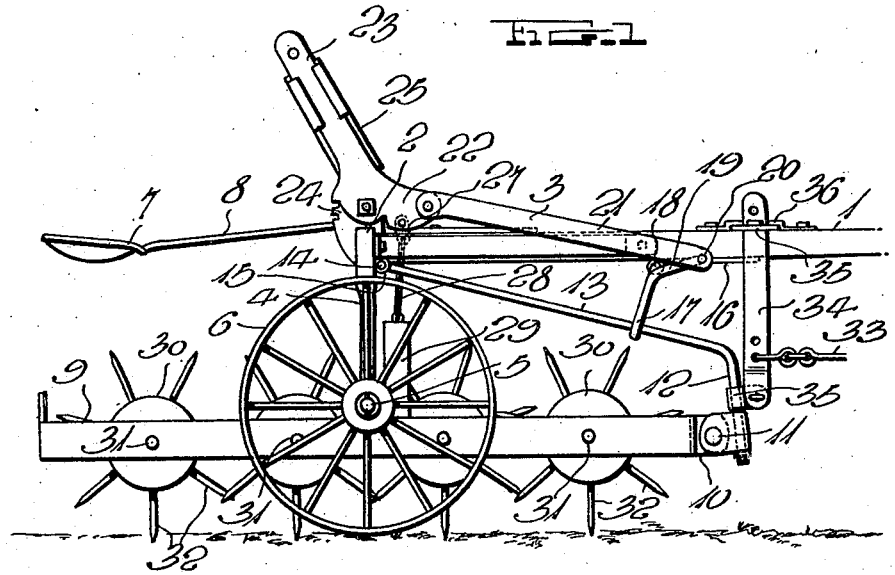

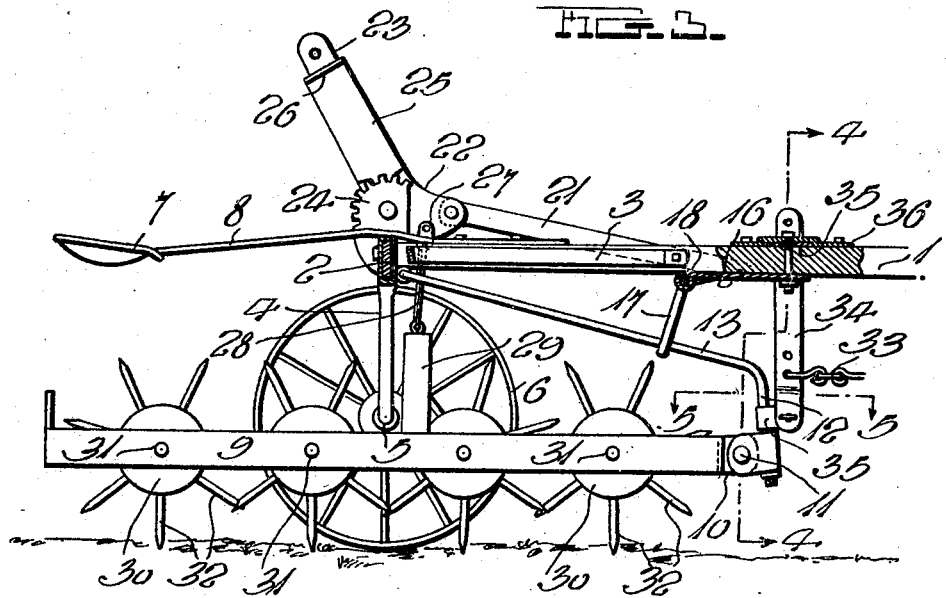

ANDREW AXELTON, OF GRAETTINGER, IOWA.

AGRICULTURAL IMPLEMENT.

1,418,123.  Specification of Letters Patent.  Patented May 30, 1922.

Application filed December 22, 1921. Serial No. 524,214.

*To all whom it may concern:*

Be it known that I, ANDREW AXELTON, a citizen of the United States, residing at Graettinger, in the county of Palo Alto and State of Iowa, have invented certain new and useful Improvements in Agricultural Implements; and I do declare the following to be a full, clear, and exact description of the invention, such as will enable others skilled in the art to which it appertains to make and use the same.

This invention relates to an improved agricultural implement of the riding type and more specifically of the harrow or weeder type and one object of the invention is to provide an agricultural machine having a main frame and auxiliary frames which carry earth working implements and are positioned beneath the main frame and supported for vertical adjustment by improved supporting means.

Another object of the invention is to so mount the auxiliary frames that they may be suspended by chains or other flexible supports and have their forward end portions connected with hanger bars which are vertically adjustable and are supported in stirrups which may be moved to adjust the hanger bars by means of latch levers which are further intended to serve as means for carrying the chains or cables.

Another object of the invention is to so construct the machine that the auxiliary frames which carry the earth working implements may be capable of a certain amount of upward movement when in an operative position and thus permitted to pass over rocks and other obstructions in a field without damage to the machine.

Another object of the invention is to so construct this machine that the pull exerted by the draft horses may be directly applied to the auxiliary frame and the pull thus exerted where the greatest resistance occurs.

Another object of the invention is to so construct this machine that the forward end portions of the auxiliary frames may be connected with hanger bars which serve not only as supporting means for the forward end portions of the auxiliary frames but also serve as drag bars for transmitting movement to the main frame of the machine when the draft animals move forwardly.

Another object of the invention is to so construct this machine that stirrups through which the hanger bars pass may be swung upwardly to lift the forward ends of the auxiliary frames at the same time that the chains are drawn upwardly to lift the frames out of an operative position.

Another object of the invention is to so construct this machine that it will be easy to operate and have a construction which will be strong and durable and not liable to get out of order or readily break.

This invention is illustrated in the accompanying drawings, wherein:

Figure 1 is a view showing the improved machine in side elevation.

Figure 2 is a top plan view of the improved machine.

Figure 3 is a longitudinal sectional view through the machine.

Figure 4 is a transverse sectional view taken along the line 4—4 of Fig. 3.

Figure 5 is a sectional view taken along the line 5—5 of Fig. 3.

This agricultural machine is provided with a main frame which includes a tongue 1 and rear cross bars 2 which extend transversely of the tongue at its rear end and is braced by diagonally extending bracing bars 3. This cross bar 2 is provided with depending side arms 4 having spindle extensions 5 upon which will be rotatably mounted the supporting wheels 6 of the main frame. The driver's seat 7 is positioned to the rear of the cross bar 2 and tongue 1 and will be connected with the rear end portion of the tongue by means of a supporting arm 8. It is to be understood of course that this main frame may be modified in its construction and that any conventional structure of main frame of this character may be used providing of course that the main frame includes a horizontal tongue and a cross bar at the rear end of the tongue from which will extend depending side arms rigid with the cross bar and having wheel-carrying spindles at their lower ends. It will be further understood that while the device has been illustrated in connection with a large horse-drawn machine, it could be constructed on a smaller scale as a hand cultivator.

The auxiliary frames 9 which are to carry the earth working implements extend longitudinally of the main frame beneath the side portions thereof or in other words upon opposite sides of the tongue 1 and each is in the form of an open frame having at its forward end a bearing ear 10 with which will be connected a hinge leaf 11 for fitting upon the downturned forward end portion 12 of a hanger bar 13. The hanger bars 13 extend longitudinally of the main frame above the auxiliary frames and each has its rear end portion bent to provide a side arm 14 which fits into a bearing 15 thus serving to pivotally mount the hanger bar at its rear end. A bearing plate 16 is secured to the underface of the tongue 1 and serves to pivotally mount stirrups 17 through which the forward end portions of the hanger bars 13 pass. Each of these stirrups is in the form of a crank shaft having its depending crank portion forming the stirrup proper and having its inner arm 18 extending horizontally and journaled in the bearing plate 16 and its outer arm bent to provide a substantially vertically disposed lever portion 19 having a side extension 20 which passes through an opening formed in the forward end of a link 21. Each of these links extend rearwardly and is loosely connected with one side of a foot extension 22 formed upon the lower end portion of a latch lever 23. The latch levers 23 are pivotally connected with racks 24 and are provided with latch plates 25 which are slidably mounted upon the latch levers and provided with side extensions 26 so that these latch plates may be readily moved into and out of engagement with the teeth of the rack. Each of the latch levers carries a pivotally mounted gear 27 with which is connected a chain 28 and the lower ends of these chains have their lower ends connected with yokes 29 carried by the auxiliary frames. These yokes are positioned at the longitudinal centers of the auxiliary frames and it will be readily seen that when the latch levers are swung to draw the chains upwardly, the auxiliary frames will be drawn upwardly. At the same time, the stirrups will be swung upwardly and the hanger bars elevated. Therefore, the auxiliary frames will at all times remain substantially horizontal. When however the machine is moving across a field and the earth working implements carried by the auxiliary frames strike large stones or other obstructions over which they cannot pass at the normal ground-engaging position, the forward end portions of the auxiliary frames may first swing upwardly and the machine may pass over the obstructions without injury being done to the earth working implements. In the present illustration, the earth working implements consist of disks 30 which are rigidly mounted upon shafts 31 carried by the auxiliary frames and carry prongs 32 which are to operate as rotary tooth harrows or as weed removing prongs. These prongs will extend in overlapping relation as the disks rotate and therefore clogs of earth and weeds picked up by the prongs will be removed. In order to draw the machine across a field, there has been provided eveners 33 which are connected with carrier bars 34. These bars 34 are disposed vertically and have their lower ends connected with bearings 35 which extend forwardly from the downturned end portions of the hanger bars. The upper ends of these carrier bars 34 extend through slots formed in the end portions of a guide strip 35 which extends transversely of the tongue 1 and through a bracket 36. A pin 37 passes through the bracket 36 and guide 35 so that this guide strip 35 will be pivotally mounted.

When the machine is in use, the draft animals are connected with the eveners 33 and the pull will be directly applied to the hanger bars 13 and through the medium of these bars to the auxiliary frames and main frame. The latch levers will be swung forwardly to bring the prongs 32 into proper engagement with the ground and as the machine moves across a field, the engagement of the prongs with the ground will cause rotation of the disks so that the prongs may cut into the ground and break up large lumps of earth in case the device is being used as a rotary harrow or dig into the ground and remove weeds in case the machine is being used as a cultivator. If a large bowlder or log is encountered, it is not necessary to swing the auxiliary frames upwardly so that the machine may safely cross the bowlder as the auxiliary frames when in the operative position are capable of vertical movement due to the fact that the hanger bars extend through the stirrups which are open at their upper ends and also due to the fact that the auxiliary frames are suspended by means of chains which provide flexible supports. Therefore, the auxiliary frames can move upwardly when the prongs engage the bowlder or log and the machine may safely pass over the obstruction. When it is desired to move from one field to another, the latch levers will be swung downwardly and rearwardly and the chains 28 will be drawn upwardly and the stirrups swung upwardly. The auxiliary frames will thus be drawn upwardly out of engagement with the ground and will be retained in the inoperative position. There has thus been provided an agricultural machine which is very effective in operation either as a rotary harrow or as a weed removing cultivator. It will be further noted that an agricultural machine has been provided which is very effective in operation and very easy to operate and further so constructed that it can be easily adjusted.

I claim:

1. An agricultural machine comprising a main frame, an auxiliary frame beneath the main frame carrying earth working means, a stirrup carried by the main frame for vertical adjustment, a hanger bar pivotally connected with the main frame and extending forwardly through the stirrup and having its forward end connected with the auxiliary frame, actuating means for adjusting the stirrup, and holding the stirrup in an adjusted position with the hanger bar held at a desired incline, and suspending means connected with the stirrup actuating means and auxiliary frame intermediate the length of the auxiliary frame.

2. An agricultural machine comprising a main frame, an auxiliary frame beneath the main frame carrying earth working means, a stirrup carried by the main frame for vertical adjustment, a hanger bar pivotally connected with the main frame and extending forwardly through the stirrup and having its forward end connected with the auxiliary frame, actuating means for adjusting the stirrup, including a latch lever, and flexible suspending means connected with the latch lever and auxiliary frame.

3. An agricultural machine comprising a main frame, an auxiliary frame beneath the main frame carrying earth working means, a stirrup pivotally carried by the main frame for vertical swinging movement, a hanger bar beneath the main frame pivotally mounted at its rear end and extending forwardly through the stirrup and having its forward end connected with the forward end of the auxiliary frame, means for adjusting said stirrup to raise and lower said hanger bar, and flexible suspending means connected with the last mentioned means and with said auxiliary frame intermediate its length.

4. An agricultural machine comprising a main frame, an auxiliary frame beneath the main frame carrying earth working means, a stirrup pivotally carried by the main frame for vertical swinging movement, a hanger bar beneath the main frame pivotally mounted at its rear end and extending forwardly through the stirrup and having its forward end connected with the forward end of the auxiliary frame, a latch lever carried by said main frame, a yoke carried by the auxiliary frame intermediate its length, a flexible connection between the yoke and latch lever, and a link connecting the latch lever and stirrup for imparting movement to the stirrup when the latch lever is moved to raise and lower the auxiliary frame.

5. An agricultural machine comprising a main frame, auxiliary frames beneath the main frame and carrying earth working implements, a guide carried by the main frame, hanger bars extending longitudinally beneath the main frame and having their rear ends pivotally connected with the main frame and their forward end portions extended downwardly and connected with the forward ends of the auxiliary frames, evener carrying bars connected with the forward end portions of said hanger bars and slidably passing through said guide, stirrups pivotally connected with the main frame with the hanger bars extending through the stirrups, latch levers carried by said main frame, flexible means connecting the latch levers with the auxiliary frames, and links connecting the latch levers with said stirrups to impart movement to the stirrups and vertically adjust the hanger bars when the levers are moved to vertically adjust the auxiliary frames through the medium of the flexible means.

In testimony whereof I have hereunto set my hand.

ANDREW AXELTON.